Dec. 19, 1967          G. CLAAS                3,358,429
        CONVEYING DRUM FOR STRAW, GRAIN, GRASS
              OR LIKE AGRICULTURAL CROPS
Filed Jan. 26, 1965                         2 Sheets-Sheet 1

INVENTOR
Günther Claas by
Michael J. Striker

Dec. 19, 1967  G. CLAAS  3,358,429
CONVEYING DRUM FOR STRAW, GRAIN, GRASS
OR LIKE AGRICULTURAL CROPS
Filed Jan. 25, 1965  2 Sheets-Sheet 2

INVENTOR
Günther Claas by
Michael S. Striker
Atty

United States Patent Office 3,358,429
Patented Dec. 19, 1967

3,358,429
CONVEYING DRUM FOR STRAW, GRAIN, GRASS
OR LIKE AGRICULTURAL CROPS
Günther Claas, 1 Am Rovekamp, Harsewinkel,
Westphalia, Germany
Filed Jan. 26, 1965, Ser. No. 428,101
Claims priority, application Germany, Jan. 28, 1964,
C 31,990
9 Claims. (Cl. 56—21)

ABSTRACT OF THE DISCLOSURE

A conveying drum assembly for a harvester, including a hollow apertured rotary drum, comprises a plurality of longitudinally extending shafts mounted for oscillatory movement and a plurality of fingers mounted on each shaft and extending through apertures in the drum. The assembly also comprises mounting means for the drum arranged in a particular manner.

The invention relates to a conveying drum for straw, grain, grass or like agricultural crops and is particularly concerned with a drum having a plurality of pivotable crop-engaging members extending from the surface thereof and actuating means for these members including a fixed cam surface and cam follower means adapted to move with the drum. Such drums are useful as picking-up drums, drawing-in drums or reels in combine harvesters and pick-up balers.

It is a principal object of the invention to provide biasing means for holding the cam follower means against the cam surface, such that the biasing means is not subject to corrosion.

It is a further object of the invention to provide such biasing means which is silent in operation.

It is yet another object of the invention to provide such biasing means which is not subject to excessive wear and is easy to fit.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed. In said annexed drawings:

Figure 1:
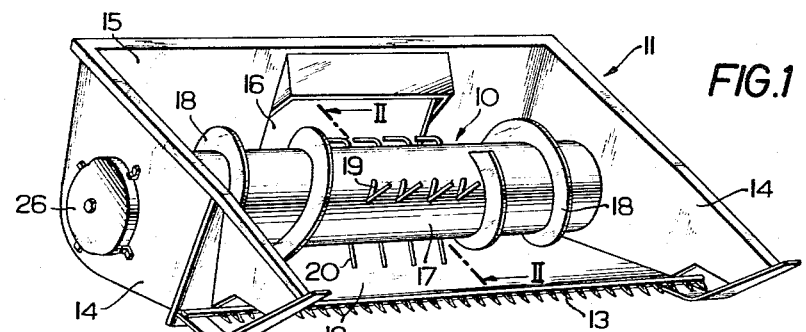
FIG. 1 is a perspective view of the cutting table of a combine harvester.

The two examples illustrated in the drawings relate to the drawing-in drum or auger of a combine harvester. This is shown at 10 in FIG. 1 and is arranged in known manner above the floor of the cutting table 11 of a combine harvester. The cutting table 11 has a floor 12, a cutter 13 in front of it, side walls 14 and a rear wall 15. A central aperture 16 in the rear wall 15 leads to an elevator passage (not shown), through which the material is supplied to the thresher. The drawing-in drum 10 has a cylindrical surface 17, the end portions of which are fitted with sheet metal ribs 18. These extend helically in opposite directions and their function is to push the crop towards the central portion (widthwise) of the table 11 from both sides. In the central portion, the surface 17 of the drum 10 contains rows of holes 19 distributed over its periphery with rod-like fingers 20 projecting through them. With the aid of these fingers 20 the material which has been pushed together by the ribs 18 into the central portion of the cutting table is conveyed through the aperture 16 into the elevator shaft (not shown). For this purpose it has been found advisable for the fingers 20 to be mounted for pivoting movement in relation to the surface of the drum 10, the position of the fingers 20 depending on the rotary position of the drum 10. With this in view (FIGS. 2 and 3) the bottoms of the fingers 20 are attached in rows to oscillating shafts 21 in the space enclosed by the surface 17; the shafts are adapted to oscillate in bearings 22 mounted on the inside of the drum surface 17. As shown particularly in FIG. 3, cranks 23 each carrying a cam follower roller 24 at the free end are attached to one end of the oscillating shafts 21. The rollers 24 of all the shafts 21 fit into a common cam track 25 integral with a bearing or mounting member 26, which rotatably mounts the drum 10 by means of the journal 27 and which is screwed onto the associated side wall of the cutting table. At the end opposite to the journal 27, the drum 10 may be mounted on a roller journal and adapted to be driven by a pulley outside the associated side wall. The cam track 25 has an arcuate portion and a chord portion. As shown at the top of FIG. 2, when the fingers 20 pass through this chord portion they are folded back away from the normal operating position. In the construction illustrated the rollers 24 fit almost exactly into the track 25. This is not absolutely essential so long as a spring load is provided for the cranks 23 to keep the rollers 24 applied to the inner cam surface 28. But even when both guiding surfaces cooperate positively with the rollers 24, spring loading is desirable, so that under normal operating conditions the rollers 24 are always applied to the same bearing surface, that is to say, so that there is no change of guidance. The only function of the cam surface 29 in this case is to fold the fingers 20 as described above should the fingers 20 be inadvertently subjected to extreme loads.

Figure 2:
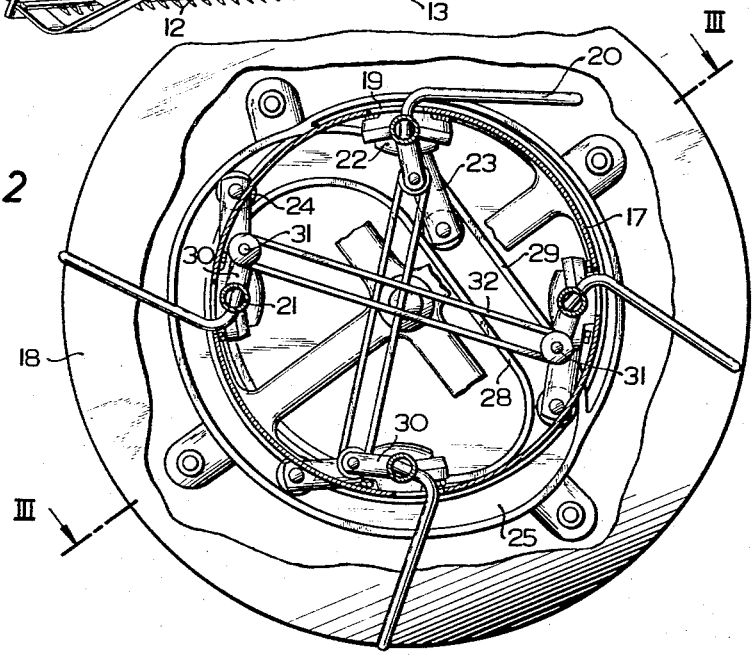
FIG. 2 is a section II—II in FIG. 1 on an enlarged scale.
Figure 3:
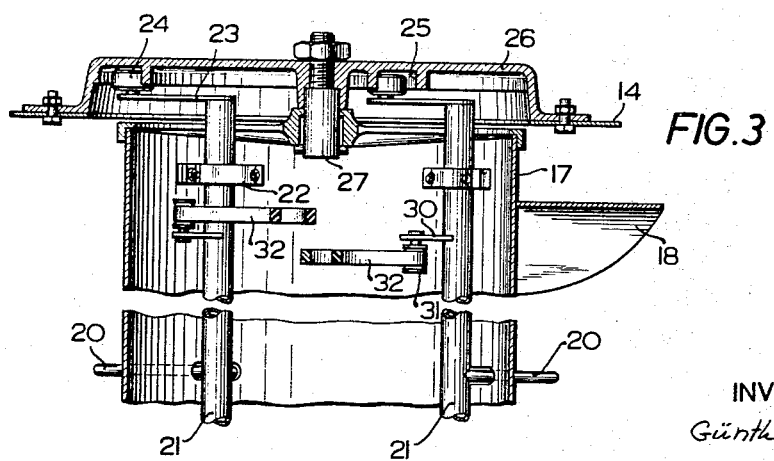
FIG. 3 is a partial section III—III in FIG. 2.

As shown in FIGS. 2 and 3, lever arms 30 are welded or otherwise attached to opposed oscillating shafts 21 in order to press the rollers 24 seated on the cranks 23 against the inner cam surface 28 of the cam track 25. The free end of each of the lever arms 30 carries a journal on which a roller 31, preferably having side flanges, is mounted for free rotation. An endless band or loop 32 of rubber-type elastic material is stretched in each case over the rollers 31 of opposed oscillating shafts 21. In order to prevent the bands 32 associated with the various pairs of oscillating shafts 21 from coming into contact, the crank arms 30 of the various pairs of shafts are offset in the direction of the longitudinal axis of the drum 10. Owing to the biasing action of the bands 32 the crank arms 23 and rollers 24 are, with the aid of the rollers 31, lever arms 30 and oscillating shafts 21, always pressed against the inner cam surface 28. Owing to the fact that the endless bands 32 are supported on rollers 31 tensions in both sections of the length of each band are readily equalised. The fact that the bands 32, acting as springs, are supported on rollers 31 means that they can be easily and reliably fitted, and no load peaks can occur in them to reduce their durability.

Figure 4:
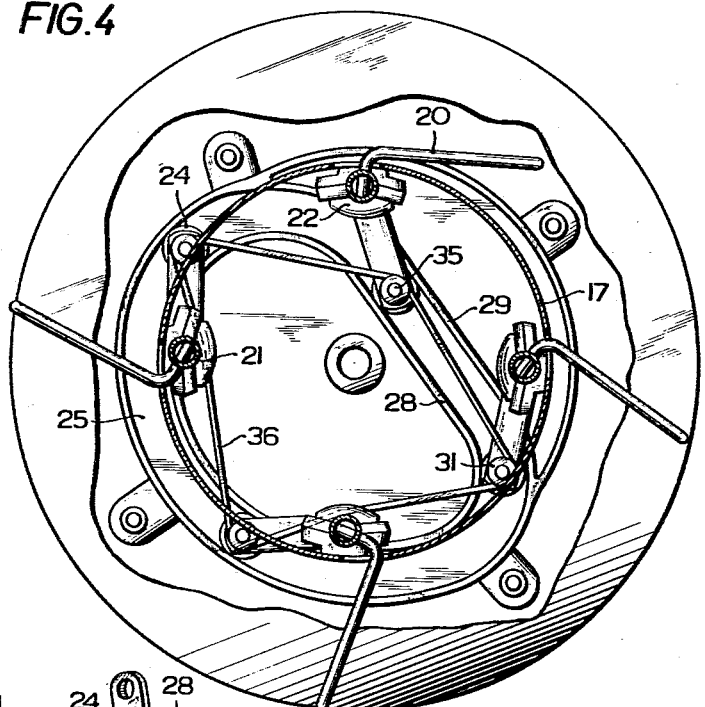
FIG. 4 is a view like that in FIG. 2 of a further embodiment.
Figure 5:
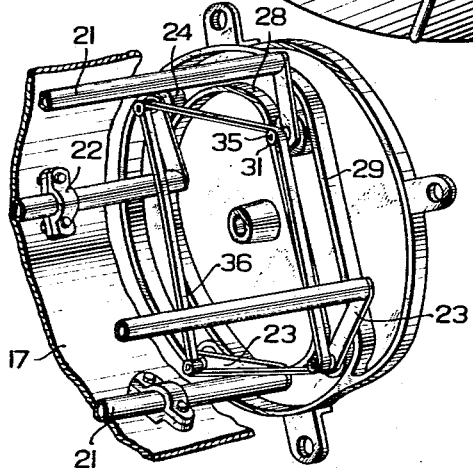
FIG. 5 is a partial perspective view of the finger drum in FIG. 4, partly broken open.

The embodiment in FIGS. 4 and 5, which is a modification of that in FIGS. 2 and 3, is also based on a drawing-in drum according to FIG. 1 with a surface 17 and controlled fingers 20 projecting therefrom, the fingers being mounted on oscillating shafts 21 guided in bearings 22 attached to the inside of the drum. A crank 23 is seated at one end of each shaft 21 and, together with a roller 24, fits into a stationary cam track 25 with an inner cam surface 28 and an outer cam surface 29. For purposes of resilient loading so as constantly to press the rollers 24 against the inner cam surface 28, the cranks 23 have additional journals 35 as shown particularly in FIG. 5. These extend in the opposite direction to the journals guiding the rollers 24 and may be coaxial therewith. A roller 31 is mounted for free rotation on each of the journals 35 and may have side flanges as in the embodiment in FIGS. 2 and 3. Extending over the rollers 31 of all the cranks 23 of the drum 10 is a rubber-type elastic band 36 forming a closed loop. The rollers 31 of all the shafts 21 may therefore be aligned axially of the drum 10.

The fact that all the oscillating shafts 21 are loaded together by an endless elastic band 36 means that the arrangement is particularly simple in construction. The load on the band 36 is kept very small, since the tensions in the four portions of its length bounded by the rollers 31 can always be equalised, since the rollers 31 are freely rotatable, and the sum of the lengths of all the portions alters only slightly in operation. Only slight demands are therefore made on the deformability of the elastic band 36. In this example the only function of the outer cam surface 29 is to exert a controlling action on the oscillating shafts in special cases. The cam surface 29 can normally be dispensed with as in the example in FIGS. 2 and 3. However, resilient loading of the shafts 21 so that they press against the inner cam surface 28 has decisive advantages even if an outer cam surface 29 is also provided, since it ensures that in normal operation the rollers 24 can always rotate in the same direction so that their surfaces do not suffer any harmful wear, which would be inevitable if the shafts 21 were not loaded resiliently.

As already mentioned, the constructions illustrated are only examples of the invention. The invention is not restricted to these and many other embodiments are possible. The arrangement in FIGS. 2 and 3 could also be used where there is a different number of pairs of oscillating shafts. In the embodiment in FIGS. 4 and 5 the number of oscillating shafts distributed over the periphery of the drum makes no difference. It is possible and in some cases desirable for a plurality of endless rubber-type elastic bands 32, 36 to be arranged parallel to one another so that the required pressing force may be produced by bands having cross-sections of appropriate size. Arrangements like those in FIGS. 4 and 5 would be obtained if the rollers 31 were provided, as in FIGS. 2 and 3, on independent lever arms connected to the oscillating shafts, so that the longitudinal position in which the bands 32, 36 operate can be chosen as desired. The shape of the elastic bands in cross-section can be freely chosen. In the constructions illustrated flat cross-sections have been used in order to restrict the stresses on the material, although the rollers 31 have only relatively small diameters. The diameter of the rollers may however be adapted to requirements. The invention may also be applied to finger drums used for different purposes.

I claim:

1. A conveying drum assembly for a harvester for straw, grain, grass or like agricultural crops, said assembly including a hollow apertured rotary drum which comprises a plurality of longitudinally extending shafts mounted therein for oscillatory movement, a plurality of fingers mounted on each of said shafts and extending through the apertures in said drum and crank means on each of said shafts, said assembly also comprising a mounting for said drum which mounting includes a cam surface with which said crank means on said shafts engage to pivot said fingers with respect to the surface of said drum during rotation of said drum, and said drum also comprising a journal carried on each of said shafts, a roller carried on each of said journals and rotatable about an axis which extends longitudinally of said drum but which is displaced from the longitudinal axis of the respective shaft and a closed loop of rubber-like elastic material passing over a plurality of said rollers to maintain the crank means of the corresponding shafts in engagement with said cam surface.

2. A conveying drum assembly for a harvester for straw, grain, grass or like agricultural crops, said assembly including a hollow apertured rotary drum which comprises a plurality of longitudinally extending shafts mounted in the drum for oscillatory movement, two of said shafts being diametrically opposed, a plurality of fingers mounted on each of said shafts and extending through the apertures in said drum and crank means on each of said shafts, said assembly also comprising a mounting for said drum which mounting includes a cam surface with which said crank means on said shafts engage to pivot said fingers with respect to the surface of said drum during rotation of said drum and said drum also comprising a lever arm carried on each of said shafts also comprising a lever arm carried on each of said shafts a roller carried on each of said lever arms and rotatable about an axis extending longitudinally of said drum and a closed loop of rubber-like elastic material passing over the rollers of said two diametrically opposed shafts to maintain the crank means of said diametrically opposed shafts in engagement with said cam surface.

3. An assembly according to claim 2, wherein the shafts are arranged in a plurality of diametrically opposed pairs and each pair of rollers associated with each pair of shafts is provided with a closed loop of rubber-like elastic material, the loops being offset from one another longitudinally of said drum.

4. A conveying drum assembly for a harvester for straw, grain, grass or like agricultural crops, said assembly including a hollow apertured rotary drum which comprises a plurality of longitudinally extending shafts mounted therein for oscillatory movement, a plurality of fingers mounted on each of said shafts and extending through the apertures in said drum and crank means on each of said shafts, said assembly also comprising a mounting for said drum which mounting includes a cam surface with which said crank means on said shafts engage to pivot said fingers with respect to the surface of said drum during rotation of said drum and said drum also comprising a journal carried on each of said shafts, a roller carried on each of said journals and rotatable about an axis which extends longitudinally of said drum but which is displaced from the axis of the respective shaft, and a closed loop of rubber-like elastic material passing over all of said rollers to maintain the crank means of the corresponding shafts in engagement with said cam surface.

5. A rotary conveying drum for a harvester for straw, grain, grass or like agricultural crops, which drum is hollow and apertured and comprises a plurality of shafts extending longitudinally of the drum and mounted therein for oscillatory movement, a plurality of fingers mounted on each of said shafts and extending through the apertures in the drum, crank means on each of said shafts for engagement with a cam surface on a fixed mounting for the drum during operation whereby said fingers are pivoted with respect to the surface of the drum during rotation of the drum, a lever arm carried on each of said shafts, a roller carried on each of said lever arms and rotatable about an axis extending longitudinally of said drum and a closed loop of rubber-like elastic material passing over a plurality of said rollers to maintain the crank means of the corresponding shafts in engagement with the cam.

6. A drum according to claim 5, wherein said loop passes over the rollers associated with two diametrically opposed shafts.

7. A drum according to claim 5, wherein the shafts are arranged as a plurality of diametrically opposed pairs, the rollers of each pair being biased towards each other by a closed loop of rubber-like elastic material and the loops being offset longitudinally of said drum.

8. A drum according to claim 5, wherein a single loop passes over all of said rollers.

9. A cutting table for a combine harvester, comprising a floor, two spaced side walls, a centrally apertured rear wall, a cutter bar extending along the front edge of the floor, a hollow rotary drum mounted longitudinally above said floor behind said cutter bar and having apertures in its central portion, a plurality of longitudinally extending shafts mounted in said drum for oscillatory movement, a plurality of fingers mounted on each of said shafts and extending through the apertures in said drum, crank means on each of said shafts, means fixedly mounted on one of said side walls and providing a cam surface such that said crank means engage with said cam surface to pivot said fingers during rotation of said drum, a lever arm carried on each of said shafts, a roller carried on each of said lever arms and rotatable about an axis extending longitudinally of said drum, a closed loop of rubber-like elastic material passing over a plurality of said rollers to maintain said crank means of the corresponding shafts in engagement with said cam surface, and helical outwardly extending ribs on the end portions of said drum adapted to convey the crop cut by the ends of said cutter bar to the central portion of said drum for delivery through the aperture in said rear wall.

References Cited

UNITED STATES PATENTS

| | | | |
|---|---|---|---|
| 1,815,327 | 7/1931 | Raney et al. | 56—364 |
| 2,256,829 | 9/1941 | Hyman | 56—364 |

FOREIGN PATENTS

| | | |
|---|---|---|
| 919,870 | 2/1963 | Great Britain. |

ABRAHAM G. STONE, *Primary Examiner.*

P. A. RAZZANO, *Assistant Examiner.*